United States Patent [19]

Tannenbaum

[11] Patent Number: 5,168,013

[45] Date of Patent: Dec. 1, 1992

[54] NON-STICK COATING SYSTEM WITH HIGH AND LOW MELT VISCOSITY PTFE FOR CONCENTRATION GRADIENT

[75] Inventor: Harvey P. Tannenbaum, Philadelphia, Pa.

[73] Assignee: E. I. Du Pont de Nemours and Company, Wilmington, Del.

[21] Appl. No.: 626,607

[22] Filed: Dec. 12, 1990

[51] Int. Cl.$^5$ .............. B32B 15/08; B32B 27/06; B05D 3/02

[52] U.S. Cl. .............. 428/422; 427/372.2; 427/385.5; 428/458; 524/514

[58] Field of Search .............. 428/421, 422, 463; 524/514, 441, 546; 427/257, 385.5; 523/346

[56] References Cited

U.S. PATENT DOCUMENTS

| | | | |
|---|---|---|---|
| 3,857,852 | 12/1974 | Tieszen | 523/346 |
| 3,928,675 | 12/1975 | Tieszen | 427/257 |
| 4,049,863 | 9/1977 | Vassilion | 428/422 |
| 4,087,394 | 5/1978 | Concannon | 524/514 |
| 4,118,537 | 10/1978 | Vary et al. | 428/421 X |
| 4,123,401 | 10/1978 | Berghmans et al. | 428/463 |
| 4,167,605 | 9/1979 | Attwood et al. | 428/419 |
| 4,252,859 | 2/1981 | Concannon et al. | 428/422 |
| 4,287,112 | 9/1981 | Berghmans | 524/441 |
| 4,425,448 | 1/1984 | Concannon et al. | 524/546 |
| 4,548,986 | 10/1985 | Suzuki et al. | 525/66 |

FOREIGN PATENT DOCUMENTS

| | | |
|---|---|---|
| 0056280 | 9/1982 | European Pat. Off. |
| 0389966 | 10/1990 | European Pat. Off. |
| 1018269 | 1/1966 | United Kingdom |

*Primary Examiner*—Thomas J. Herbert, Jr.
*Attorney, Agent, or Firm*—Richard H. Burgess

[57] ABSTRACT

Improved non-stick coating systems can be applied to untreated smooth substrate with a primer of a first polytetrafluoroethylene having a melt viscosity over $10^{10}$ poises plus a second polytetrafluoroethylene having a melt viscosity in the range of $10^3$ to $10^8$ poises to give a concentration gradient.

16 Claims, No Drawings

NON-STICK COATING SYSTEM WITH HIGH AND LOW MELT VISCOSITY PTFE FOR CONCENTRATION GRADIENT

BACKGROUND OF THE INVENTION

This invention relates to coatings systems, such as for cookware, which minimize sticking. More particularly, it relates to multilayer coating systems that can be used directly on smooth, untreated substrates and which provide concentration gradients within the coating.

Generally in the art a metal or glass substrate is roughened by some means before the first layer of coating is applied so that mechanical bonding will assist chemical adhesive means in holding the coating onto the substrate. Typical roughening means include acid etching, sand-blasting, grit-blasting, and baking a rough layer of glass, ceramic or enamel frit onto the substrate. The problem of adhesion of non-stick coatings to substrates is exacerbated by the nature of the coatings. If the coating is optimized for release to prevent food particles from sticking to it, for easy clean-up after cooking or durability, or to facilitate low friction sliding contact, almost by definition there will be difficulties in making it adhere well to the substrate.

The substrate can be metal, often aluminum or stainless steel used for cookware or industrial applications. It can be glass or ceramic. It might even be plastic for microwave oven cookware, or it could be an industrial article such as a saw made of carbon steel. Whatever the substrate or the application, if it is necessary to roughen the substrate to make the coating adhere, that at least adds cost and can cause other difficulties including creating a rough profile which can protrude or telegraph through the coating. This is especially undesirable when smoothness is sought, such as for saws, steam irons and copier rolls. The environmental cost of disposing of etchant materials can be significant. Sometimes, especially for glass and ceramic substrates, it also can cause unacceptable weakness or brittleness of the substrate.

Means of enhancing adhesion of non-stick coatings to a substrate are illustrated by the following patents.

U.S. Pat. No. 4,049,863—Vassiliou (1977) teaches a primer containing fluoropolymer, such as polytetrafluoroethylene (PTFE), colloidal silica and a polyamide imide (PAI), along with other constituents, applied by various techniques to a substrate that is preferably pretreated by grit blasting, flame spraying of metals or metal oxides or frit coating, or to phosphated and chromated metals. The PTFE:PAI ratio can be 1:9. The primer coat is ordinarily applied to a dry film thickness (DFT) of about 2-15 microns ($\mu$m). After air drying, the primer is topcoated with a conventional fluoropolymer enamel and baked. (Parts, percentages and proportions herein are by weight except where indicated otherwise.)

U.S. Pat. No. 4,087,394—Concannon (1987) discloses aqueous concentration gradient coatings of fluoropolymer which is 20-80% of a homopolymer or a copolymer of fluorinated ethylene-propylene (FEP) made of 5-100% tetrafluoroethylene (TFE) with 95-0% hexafluoropropylene (HFP), with 80-20% of a film forming polymer which can be PAI. The coating is applied by spraying onto aluminum sheet, or a variety of substrates. Other application techniques are mentioned. Nothing is said about substrate preparation. Although PTFE and FEP are treated as a continuum, there are no suggestions to use a blend such as 50% PTFE, 50% FEP.

Representative of nonaqueous perfluoropolymer concentration gradient patents are U.S. Pat. Nos. 3,661,831 (1972) and 4,143,204 (1979) on FEP (preferably 3-20% HFP, balance TFE) with various film formers including PAI. At the end of each specification, example 24 teaches using such a coating as a primer under an ordinary PTFE topcoat on a frypan. U.K. 1,230,339 (1971) claims articles coated with nonaqueous PTFE-PAI with a concentration gradient. This and equivalent Canadian 887,122—Fang (1971) provide a single coating of PAI and PTFE on a metal substrate with a concentration gradient from mostly PAI at the substrate to mostly PTFE at the air interface. This is applied as a single coat without any special primer on ordinary steel or sandblasted aluminum.

A mixture of FEP and PTFE in an organic dispersion is in U.S. Pat. No. 3,904,575 (1975)—Satokawa. This says that lower molecular weight PTFE permits more FEP to be included in a stable dispersion. The use of PAI and other film formers is also disclosed. The examples teach sand blasting an aluminum substrate before applying the coating.

Also, U.K. 1,454,255—Berghmans and Seymus (1976) discloses aqueous dispersion coatings of mixtures of PTFE and FEP with $SiO_2$ and aluminum phosphate applied preferably to grit-blasted or frit-coated aluminum, but also specifically to untreated aluminum.

U.S. Pat. No. 4,287,112—Berghmans (1981) discloses PPS with PTFE, FEP and/or a copolymer of tetrafluoroethylene and hydrocarbon ether monomer which have been completely substituted with fluorine atoms as described in U.S. Pat. Nos. 4,292,859 (1981) and 4,351,883 (1982)—both Concannon, known as PFA, along with Al flake and $TiO_2$ pigment, in both aqueous and non-aqueous coatings. The preferred PTFE is irradiated micropowder. PTFE micropowder may be made according to the teachings of U.S. Pat. Nos. 3,116,226—Bowers (1963), 4,029,890—Brown et al (1977) or 4,200,551—Derbyshire (1980).

Coatings systems including intermediate and top coats useful with the present invention are described in various patents including:

U.S. Pat. No. 4,049,863—Vassiliou (1977);
U.S. Pat. No. 4,118,537—Vary and Vassiliou (1978);
U.S. Pat. No. 4,123,401—Berghmans and Vary (1978);
U.S. Pat. No. 4,252,859—Concannon and Vary (1981);
U.S. Pat. No. 4,351,882—Concannon (1982); all incorporated herein by reference.

SUMMARY OF THE INVENTION

The present invention, in certain of its embodiments, provides a coating composition comprising perfluorocarbon resin and at least one of polyamide imide and polyether sulfone resins, wherein the perfluorocarbon resin comprises at least two different polytetrafluoroethylene resins, the first having a melt viscosity of at least $10^{10}$ poises, and the second having a melt viscosity in the range of $10^3$ to $10^8$ poises.

DETAILED DESCRIPTION

The present invention permits not only lower cost by avoiding the roughening of the substrate but also smoother coated surfaces which can be advantageous for release on cookware, and for the gliding effect on steam iron sole plates. Also it can allow elimination of costly polishing of coated copier roll surfaces and application of dispersion PTFE coatings by coil coating and roller coating techniques.

The adhesion of high melt viscosity fluoropolymer coatings to all types of metal substrates, particularly to smooth metal, can be significantly improved through chemically induced stratification or formation of a concentration gradient in the primer. Addition of perfluorocarbon polymer having a melt viscosity (MV) in the range of $10^3$–$10^8$ poise, to a primer system composed of PTFE (MV=$10^{11}$) and a polymeric binder such as polyamide-imide or polyphenylene sulfide, imparts a synergistic effect in which the fluoropolymer stratifies away from the substrate interface allowing the polymeric binder to obtain a higher concentration and degree of cure at the substrate interface resulting in improved adhesion. The required cure temperature to achieve this stratification can be modified by the choice of fluoropolymer.

With use of the coatings of the invention on smooth substrates, treated only by washing to remove grease and any other contaminants which might interfere with adhesion, coating systems of the invention give good food release and good resistance to usual durability tests such as the "tiger paw" abuse cooking tests involving a weighted holder with multiple ball point pen shafts rotating around the inside of a frying pan during cooking tests. The tests are generally described in U.S. Pat. No. 4,252,859, col. 2, lines 14–24.

Typical prior art preparation of surfaces to enhance adhesion of a release coating has involved etching or sand or grit blasting to develop a surface profile. The profile is measured in average microinches using a model RT 60 surface roughness tester made by Alpa Co. of Milan, Italy. The profile on typical rolled aluminum after washing to remove grease and contaminants is 16-24 microinches. The profile on steel varies more widely but is typically less than 50 microinches. On both steel and aluminum, before a release coating is applied the profile typically is increased to over 100 micro inches, preferably for aluminum for some uses to 180-220 micro inches. Thus, the present invention is particularly useful with steel or aluminum substrates having a profile of less than 100, preferably less than 50 micro inches.

The primers of the invention can also be used on substrates roughened in various ways known in the art to make coating systems even better than without such undercoats. This can combine improved chemical adhesion with mechanical effects to produce products that may be superior.

In the following examples, the polyamide imide, colloidal silica and dispersions preferably are those of U.S. Pat. No. 4,049,863—Vassiliou (1977); the ultramarine blue is that of U.S. Pat. No. 4,425,448—Concannon and Rummel (1984); the polyether sulfone is that of U.S. Pat. Nos. 3,981,945 (1976), 4,090,993 (1978) —both Atwood et al, and 4,131,711 (1978)—Atwood, and the polyarylene sulfide is the polyphenylene sulfide of U.S. Pat. No. 4,287,112 (1981)—Berghmans.

The following examples and test data demonstrate this improved adhesion when used as a primer for fluoropolymer topcoats. The fluoropolymers are provided as 60% dispersions in water. The compositions were blended by techniques normal in the art and them applied to a smooth, degreased aluminum substrate by spraying.

EXAMPLE 1

Polymerization and Concentration of Lower MV PTFE

A cylindrical, horizontally disposed, water jacketed, stirred, stainless steel reactor having a length to diameter ratio of about 1:5, a 4-bladed cage-type agitator running the length of the reactor, and a water capacity of about 80 parts was charged with 46 parts of demineralized water and 0.022 parts of ammonium perfluorocaprylate dispersing agent. The reactor was pressure tested at 2.8 MPa and 90° C. while stirring the reactor contents at 46 rpm. The reactor was then cooled to reduce the temperature of its contents below 30° C. The reactor was then evacuated and purged three times with tetrafluoroethylene (TFE) monomer, leaving a reduced pressure on the reactor after the final evacuation. A valve was then opened to slowly release ethane into the reactor until the pressure was raised by 0.06 MPa. The valve was then closed and the reactor temperature was raised to 90° C. with the agitator running at 46 rpm. After the temperature reached 90° C., the reactor was pressurized with TFE to a pressure of 2.6 MPa. A freshly prepared solution of 1.1 parts of a solution of (0.1%) ammonium persulfate (APS) and (1.5%) disuccinic acid peroxide (DSP) in demineralized water was pumped into the reactor at a rate of 0.11 parts/minute to initiate polymerization. After polymerization began (0.07 MPa drop in reactor pressure), additional TFE was added to the reactor at a rate so as to maintain the pressure at 2.6 MPa. After 3 parts of TFE had been added to the reactor after kickoff, 2.2 parts of a 2.4% solution of ammonium perfluorocaprylate in demineralized water was pumped into the reactor at a rate of 0.2 parts/minute. After 15 parts TFE addition, 0.66 parts of a solution of APS (0.05%), DSP (0.5%), and methanol (0.5%) in demineralized water were pumped into the reactor at a rate of 0.11 parts/minute. When 22 parts of TFE had been added to the reactor, the TFE feed was stopped but the reaction was continued until the reactor pressure dropped to 1.3 MPa. The reactor was then vented and the product dispersion was removed. The dispersion contained about 34% polymer by weight. A small amount of the dispersion was coagulated by the application of vigorous stirring and the resulting powder was then dried in a 120° C. oven.

The melt viscosity of the dried resin was measured at 372° C. by the procedure described in ASTM D-1238-52T modified by (1) using a cylinder, orifice, and piston tip made of a corrosion-resistant alloy, Hayes Stellite 19, (2) charging a 5.0 g sample to the 9.53 mm ID cylinder, and (3) five minutes after charging, the sample is extruded through a 2.10 mm diameter, 8.00 mm long square-edged orifice under a load of 5000 g. The melt viscosity in poise was calculated as 36,910 divided by the observed extrusion rate expressed in grams per minute. The melt viscosity of this dried powder was $5.6 \times 10^4$ poise.

The remaining as-polymerized dispersion was heated to 80° C. while gently stirring. When the temperature reached 40°–45° C., a weight of Triton X-100 non-ionic surfactant of octyl phenol polyether alcohol sold by Rohm and Haas Co. equivalent to 8% of the weight of polymer was added to the dispersion. Citric Acid (0.02% based on polymer) and then 19% aqueous ammonium carbonate solution (0.7% based on polymer) were then added. When the temperature reached 80° C., the agitation and heat were stopped. Upon cooling, the dispersion separated into two layers with nearly all of the polymer being concentrated in the lower layer. This lower layer was removed and analyzed for % solids and % Triton. The respective levels were found to be 53.6% solids and 3.7% Triton. Adjustments were made with water and Triton X-100 additions so that the final levels were 46.7% and 8.9% respectively.

EXAMPLE 2

Low MV PTFE/PTFE - Multiple Coat System

Composition

TABLE 1

| Weight Percent | |
|---|---|
| 0.008 | Zinc oxide |
| 0.050 | "Afflair 153" titania coated mica from EM Industries |
| 6.701 | Ultramarine blue pigment |
| 6.966 | "T-30" PTFE from Du Pont |
| 1.002 | "Ludox AM" colloidal silica from Du Pont |
| 4.760 | L171 PTFE micropowder from ICI |
| 4.790 | AI-10 polyamide imide resin from Amoco |
| 66.319 | Deionized water |
| 0.455 | "Triton X-100" octyl phenol polyether alcohol non-ionic surfactant from Rohm and Haas |
| 0.676 | Diethylethanolamine |
| 1.352 | Triethylamine |
| 3.728 | Furfuryl alcohol |
| 3.193 | N-methyl pyrolidone |
| 100.000 | TOTAL |

Application

This system is comprised of a primer of the invention which is applied at 5-10 μm dry film thickness (DFT) to a metal surface which has been washed to remove oil and dirt contamination, air dried, and topcoated with a single (15-17.5 μm DFT) or multiple topcoats in thicknesses of 12.5-17.5 μm DFT each and having compositions similar to those shown in the Table 1. The films are baked 10 minutes at 150° C. followed by a high temperature bake for a minimum of 3 minutes over 415° C.

Two different proportions of PTFE resins were used as a primer with a topcoat on smooth aluminum cookware which was subjected to tiger paw testing, described above. The number of standard cooking cycles to a rating of 5, determined by coating deterioration, was recorded and presented below along with the percentages of the comparable value for a commercial coating on a grit-blasted substrate run as a control. The results are better than many good commercial products.

Testing

TABLE 2

| Cooking Performance of Low MV PTFE/PTFE Primer | | | | | |
|---|---|---|---|---|---|
| low/MV/ | | | Cooks to Rating of 5 | | |
| Regular PTFE | Surface | DFT | Range | Average | % of Commercial |
| 40/60 | Smooth | 1.0-1.1 | 55-70 | 62 | 103 |
| 30/70 | Smooth | 1.0-1.1 | 55-60 | 60 | 100 |

Low MV PTFE for the invention can be provided in the form of as-polymerized micropowder made in accordance with Example 1 or in the form of irradiated and comminuted or ground micropowder made by techniques such as taught by the above-identified Brown et al and Derbyshire patents and used in this Example 2.

A preferred topcoat is that of Example 1 of U.S. Pat. No. 4,118,537. Alternatively, the coats above the undercoat and primer (topcoat and optional intermediate coats) can be those of U.S. Pat. Nos. 4,252,854; 4,351,882; and 4,425,448, and combinations thereof.

I claim:

1. An aqueous coating composition comprising perfluorocarbon resin and polyamide imide resins, wherein the perfluorocarbon resin comprises at least two different polytetrafluoroethylene resins, the first having a melt viscosity of at least $10^{10}$ poises and the second having a melt viscosity in the range of $10^3$ to $10^8$ poises.

2. The coating composition of claim 1 wherein the perfluorocarbon resin contains, by weight, about 50-90% of said first resin, and 50-10% of said second resin.

3. The coating composition of claim 1 wherein the perfluorocarbon resin consists essentially of, by weight, about 60-85% of said first resin, the balance said second resin.

4. The coating composition of claim 1 wherein the melt viscosity of said first resin is at least $10^{11}$ poises and of said second resin is in the range of $10^4$–$10^6$ poises.

5. The coating composition of claim 4 consisting essentially of, by weight, about 3-5% colloidal silica, 1-4% surfactant, 15-30% polyamide imide resin, and 25-55% perfluorocarbon resin and the perfluorocarbon resin consists essentially of 60-85% of said first resin, the balance said second resin.

6. The coated substrate wherein the coating is a multilayer non-stick coating comprising a primer, a topcoat and up to one or more intermediate coats between the primer and the topcoat, wherein the substrate is free of contaminants that would prevent adhesion of the coating and the primer is a coating composition of claim 5.

7. A coated substrate wherein the coating comprises a coating composition of claim 1.

8. The coated substrate of claim 7 wherein the substrate is free of contaminants that would prevent adhesion of the coating.

9. The coated substrate wherein the coating is a multilayer non-stick coating comprising a primer, a topcoat and up to one or more intermediate coats between the primer and the topcoat, wherein the substrate is free of contaminants that would prevent adhesion of the coating and the primer is a coating composition of claim 1.

10. The coated substrate of claim 9 wherein, before application of the undercoat, the surface of the substrate has been treated to remove contaminates that would interfere with adhesion but has not been etched or mechanically roughened.

11. The coated substrate of claim 9 wherein the primer coating resulting from said aqueous dispersion is not uniform in composition throughout its thickness but has a lower concentration of said first polytetrafluoroethylene at the interface with the substrate than at the opposite interface.

12. The coated substrate of claim 9 wherein the coating comprises at least one intermediate coat containing the ingredients of the primer.

13. The coated substrate of claim 9 wherein the substrate is metal selected from aluminum, stainless steel and carbon steel.

14. The coated substrate of claim 13 wherein the substrate before coated has a surface roughness profile less than 100 micro inches.

15. The coated substrate of claim 13 wherein the substrate before coating has a surface roughness profile less than 50 micro inches.

16. A process of making the coating substrate of claim 9 wherein the coatings are applied to the substrate without completely drying one coating before applying the next, and then the entire coating is cured by heating at at least 350° C.

* * * * *